United States Patent
Aslanyan et al.

(10) Patent No.: US 11,209,559 B2
(45) Date of Patent: Dec. 28, 2021

(54) METHOD AND SYSTEM FOR ANALYZING A BOREHOLE USING PASSIVE ACOUSTIC LOGGING

(71) Applicant: Limited Liability Company "SONOGRAM", Moscow (RU)

(72) Inventors: Artur Mikhailovich Aslanyan, Kazan (RU); Dmitry Aleksandrovich Davydov, Kazan (RU); Sergey Pavlovich Andronov, Kazan (RU); Vladimir Vladimirovich Bochkarev, Kazan (RU); Yuliya Anatolievna Zakirova, Kazan (RU)

(73) Assignee: TGT Oilfield Services Limited, Road Town (VG)

( * ) Notice: Subject to any disclaimer, the term of this patent is extended or adjusted under 35 U.S.C. 154(b) by 111 days.

(21) Appl. No.: 16/647,106

(22) PCT Filed: Jun. 7, 2018

(86) PCT No.: PCT/RU2018/050062
§ 371 (c)(1),
(2) Date: Mar. 13, 2020

(87) PCT Pub. No.: WO2019/054905
PCT Pub. Date: Mar. 21, 2019

(65) Prior Publication Data
US 2020/0278464 A1    Sep. 3, 2020

(30) Foreign Application Priority Data
Sep. 13, 2017  (EA) ................... 201791837

(51) Int. Cl.
*G01V 1/28*     (2006.01)

(52) U.S. Cl.
CPC .............. *G01V 1/288* (2013.01); *G01V 1/282* (2013.01)

(58) Field of Classification Search
CPC .... G01V 1/288; G01V 1/282; G01V 2210/65; G01V 2210/38; G01V 1/40; E21B 47/107; E21B 47/00
See application file for complete search history.

(56) References Cited

U.S. PATENT DOCUMENTS 5,917,160 A * 6/1999 Bailey ................ G01V 1/42
                                                     181/112
7,039,198 B2   5/2006 Birchfield et al.
(Continued)

FOREIGN PATENT DOCUMENTS

CA     3075876 A1 *  3/2019  ........... E21B 47/107
CN     101832132      9/2010
(Continued)

*Primary Examiner* — Daniel Pihulic
(74) *Attorney, Agent, or Firm* — Boyle Fredrickson S.C.

(57) ABSTRACT

The claimed invention relates to means for analysis of a mineral deposit under development using noise logging. The aim of invention consists in increasing accuracy of sound source position determining at surveying in wells with complicated multi-barrier design. The method for locating an acoustic noise source in a well comprises the stages of:
computer simulation of acoustic field generated by one or more sources of acoustic signal in the well;
simultaneous recording of acoustic signals inside the wellbore using a device for recording acoustic signals comprising at least two acoustic sensors;
locating the sought acoustic signal sources in the well by means of co-processing of computer simulation data and data on acoustic signals inside the wellbore recorded using the aforementioned device.

20 Claims, 6 Drawing Sheets

(56) References Cited

U.S. PATENT DOCUMENTS

2010/0262373 A1   10/2010  Khadhraoui et al.
2020/0278464 A1*  9/2020   Aslanyan ............... G01V 1/288

FOREIGN PATENT DOCUMENTS

| GB | 2581633 A * | 8/2020 | ........... E21B 47/107 |
| RU | 2593620 | 8/2016 | |
| WO | 2013008035 | 1/2013 | |
| WO | 2016115012 | 7/2016 | |
| WO | 2017044244 | 3/2017 | |
| WO | WO-2019054905 A1 * | 3/2019 | ............. G01V 1/282 |

* cited by examiner

METHOD AND SYSTEM FOR ANALYZING A BOREHOLE USING PASSIVE ACOUSTIC LOGGING

FIELD OF THE INVENTION

The claimed invention relates to means for analysis of a mineral deposit under development using noise logging. The spectral (acoustic) well noise logging relates to geophysical methods for survey of oil and gas production wells with the aim to analyze well operating conditions, identify the releasing and absorbing intervals of formation, and determine hydrodynamic parameters of beds. The spectral noise logging is based on recording of acoustic noises produced during liquid or gas motion through the formation or open discontinuities into well structure.

PRIOR ART

A method for determining integrity of well casing, fluid flow geometry and composition inside wellbore, and reservoir condition based on analysis of acoustic data was proposed in patent WO 2013/008035 A2. The disclosed method includes three basic stages, namely, recording acoustic noises in the well, processing the recorded data to determine sound speed as a function of depth and/or time, and finally analyzing obtained functions. At the first stage, fiber-optic sensors are introduced in the well and record the signal simultaneously at many depths. At the next stage, mathematical tools are used to determine sound speed, relative amplitudes of various signal modes and dispersion characteristics at all measured depths. At this stage, a model of acoustic noise propagation in the well is used to derive unknown well characteristics such as, for example, rock hardness. Sound speed values are input parameters of such model. Finally, variations of sound speed in various signal modes are studied using all possible techniques in order to determine the depths corresponding to either degassing into borehole or solid inclusions.

The disclosed method is disadvantageous in that the only optical fiber can be used as the recording sensors. Unfortunately, existing sensors of this type are limited by low recorded frequencies (few or at most several tens of kilohertz), while many important well phenomena, such as fluid flow through an open discontinuity or reservoir, can create noises with frequencies up to 100 kHz.

A method for real-time detecting and locating microseismic events occurring in a well was proposed in the US Patent Application 2010/0262373. In this method, acoustic noises are detected by three-component sensors. Then characteristics of recorded signals are determined such as S-wave and P-wave arrival times and, if possible, their incidence angles, which enables to estimate signal-to-noise ratio for each polarization. So obtained parameters are compared with simulated ones by means of building up the objective function and finding its extrema using a gradient descent technique.

Disadvantage of this method consists in that it is designed to detect and localize exclusively seismic phenomena such as, for example, development of cracks in reservoir during hydraulic fracturing procedure, but hardly can be used to evaluate operating intervals of the reservoir, integrity of the well design, or any other parameters associated with fluids motions.

The closest prior art of the present invention is disclosed in patent WO 2016/115012 A1. This patent discloses a method and system for detecting and locating one or more sources of acoustic noises in a well. For this purpose, a device with three or more sensors is used in the disclosed invention, the sensors being selectable among hydrophones, fiber optic cables or fiber Bragg gratings. The device simultaneously records signals from all sensors. The invention further comprises a signal processing method based on formation of receiving aperture for locating signal sources.

Main disadvantages of disclosed invention are complicated circuitry due to with necessity to use at least three sensors and lack of detailed model of acoustic signal propagation in a well, which leads to insufficient accuracy in determining parameters in the case of multi-barrier structures.

SUMMARY OF THE INVENTION

The object of present invention is to locate an acoustic noise source in a well using passive acoustic logging recorded by a device with simplified circuitry comprising two or more sensors and new methods of acoustic data processing and analysis.

The aim of the invention consists in increasing accuracy of sound source position determining at surveying in wells with complicated multi-barrier design.

Acoustic noises in a well can be generated by fluids flowing through open discontinuities in the well design, lateral flows in the reservoir, intrareservoir communications, and other phenomena that cause acoustic emission.

The aim and the object of present invention are achieved by locating acoustic noise sources in a well using the method that comprises stages of:

Computer simulation of acoustic field generated by one or more sources of acoustic signal in the well;

Simultaneous recording of acoustic signals inside the wellbore using a device for recording acoustic signals comprising at least two acoustic sensors;

Locating the sought acoustic signal sources in the well by means of co-processing of computer simulation data and data on acoustic signals inside the wellbore recorded using the aforementioned device.

In a particular embodiment of the method, position of an acoustic signal source is characterized by depth from the surface and distance from the well axis.

In a particular embodiment of the method, acoustic signals inside the wellbore are recorded synchronously by all sensors.

In a particular embodiment of the method, computer simulation of acoustic field in the well is made using an acoustic simulator.

In a particular embodiment of the method, acoustic signals in a well are recorded at two or more depths if two or more acoustic sensors are used.

In a particular embodiment of the method, azimuthal noise source direction is additionally determined in the case of azimuthal distribution of three or more acoustic sensors in the well.

In a particular embodiment of the method, a well source generated acoustic field is calculated in the stage of computer simulation at various distances from the source for various source depths and radial distances from wellbore.

In a particular embodiment of the method, the calculations are performed taking into consideration the well design parameters including at least radii of the well barriers.

In a particular embodiment of the method, types of barrier media, surrounding media and/or filling fluids in annuli are additionally taken into consideration.

In a particular embodiment of the method, group delays, phase delays, and/or acoustic sensor signal acoustic energy differences are determined by the device after recording acoustic signals from inside the wellbore in the stage of computer simulation.

In a particular embodiment of the method, results of computer simulation are compared with data on acoustic signals inside the wellbore recorded using the aforementioned device by means of building up an objective function based on group delays, phase delays, and/or acoustic sensor signal acoustic energy differences with the source position in the wellbore as the argument.

In a particular embodiment of the method, source position in the wellbore is determined from an extremum of the objective function.

In another preferred embodiment of the claimed invention, a system for well analysis using a passive acoustic logging is provided, comprising:

a device for recording acoustic signals inside a wellbore, comprising at least two acoustic sensors and designed to receive data on one or more acoustic signal sources in the well and transmit received data to a computing device and a computing device comprising at least one processor and at least one machine-readable instruction storage unit and designed to simulate acoustic field generated by one or more sources of acoustic signal in the well by means of executing the stored instructions by at least one processor, wherein:

the computing device is designed to co-process computer simulation data and data on acoustic signals inside the wellbore recorded by the aforementioned recording device and locate the sought acoustic signal source based on said co-processing.

In a particular embodiment of the system, the computing device is selected from the group consisting of computer, tablet, server or smartphone.

In a particular embodiment of the system, the acoustic signal recording device transmits scan data to the computing device via a wired or wireless data channel.

In a particular embodiment of the system, position of an acoustic signal source is characterized by depth from the surface and distance from the well axis.

In a particular embodiment of the system, acoustic signals inside the wellbore are recorded synchronously by all sensors of the acoustic signal recording device.

In a particular embodiment of the system, computer simulation of generated acoustic field in the well is made using an acoustic simulator.

In a particular embodiment of the system, acoustic signals in a well are recorded at two or more depths if two or more acoustic sensors are used.

In a particular embodiment of the system, azimuthal noise source direction is additionally determined in the case of azimuthal distribution of three or more acoustic sensors in the well.

In a particular embodiment of the system, a well source generated acoustic field is calculated by the computing device in the stage of computer simulation at various distances from said source for various said source depths and radial distances from wellbore.

In a particular embodiment of the system, the calculations are performed taking into consideration the well design parameters including at least radii of the well barriers.

In a particular embodiment of the system, types of barrier media, surrounding media and/or filling fluids in annuli are additionally taken into consideration.

In a particular embodiment of the system, group delays, phase delays, and/or acoustic sensor signal acoustic energy differences are determined by the computing device in the stage of computer simulation after receiving data on acoustic signals from inside the wellbore recorded by the recording device.

In a particular embodiment of the system, results of computer simulation are compared by the computing device with data on acoustic signals inside the wellbore recorded by the said recording device by means of building up an objective function based on group delays, phase delays, and/or acoustic sensor signal acoustic energy differences with the source position in the wellbore as the argument.

In a particular embodiment of the system, source position in the wellbore is determined from an extremum of the objective function.

DETAILED DESCRIPTION OF THE INVENTION

Below, a detailed description of the invention is provided with reference to corresponding drawings. It should be noted that these drawings illustrate only the most preferred embodiments of the claimed technical solution and do not limit the requested scope of protection in other specific forms of its implementation.

The claimed method for locating acoustic noise source or sources comprises main stages of: calculating the acoustic field in the well using computer simulation; recording acoustic noise inside the well using a passive acoustic logging device equipped with two or more sensors at two or more depths, and determining source or sources depth from the surface and distance from the well axis based on co-processing of recorded data and data obtained from the computer simulation.

Figure 1:
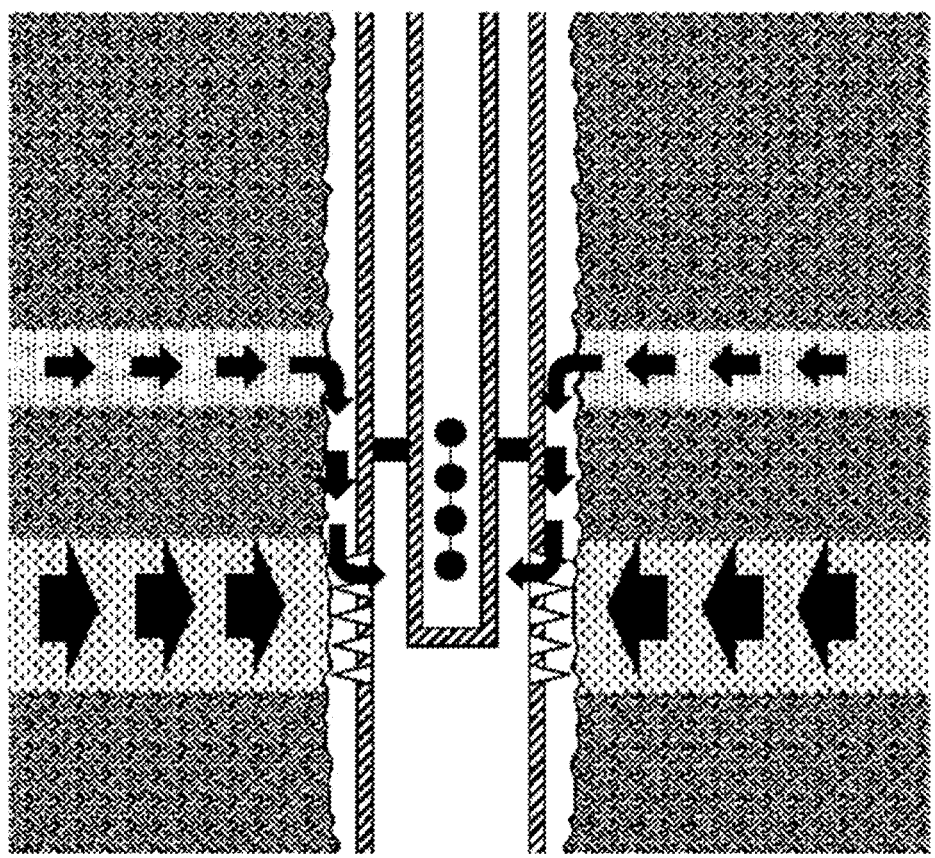
FIG. 1 shows a possible arrangement of recording sensors in a multi-barrier wellbore during passive acoustic logging with the aim to determine position or positions of acoustic noise source or sources. The recording sensors may be arranged in line along the well axis, as shown in the figure, or not in line with one another. In turn, sensors that are arranged in line with one another may be evenly or unevenly spaced. Arrows in the figure indicate possible sources of acoustic noise in the well such as fluid seepage through a reservoir or fluid communication from an overlying reservoir.
Figure 2:
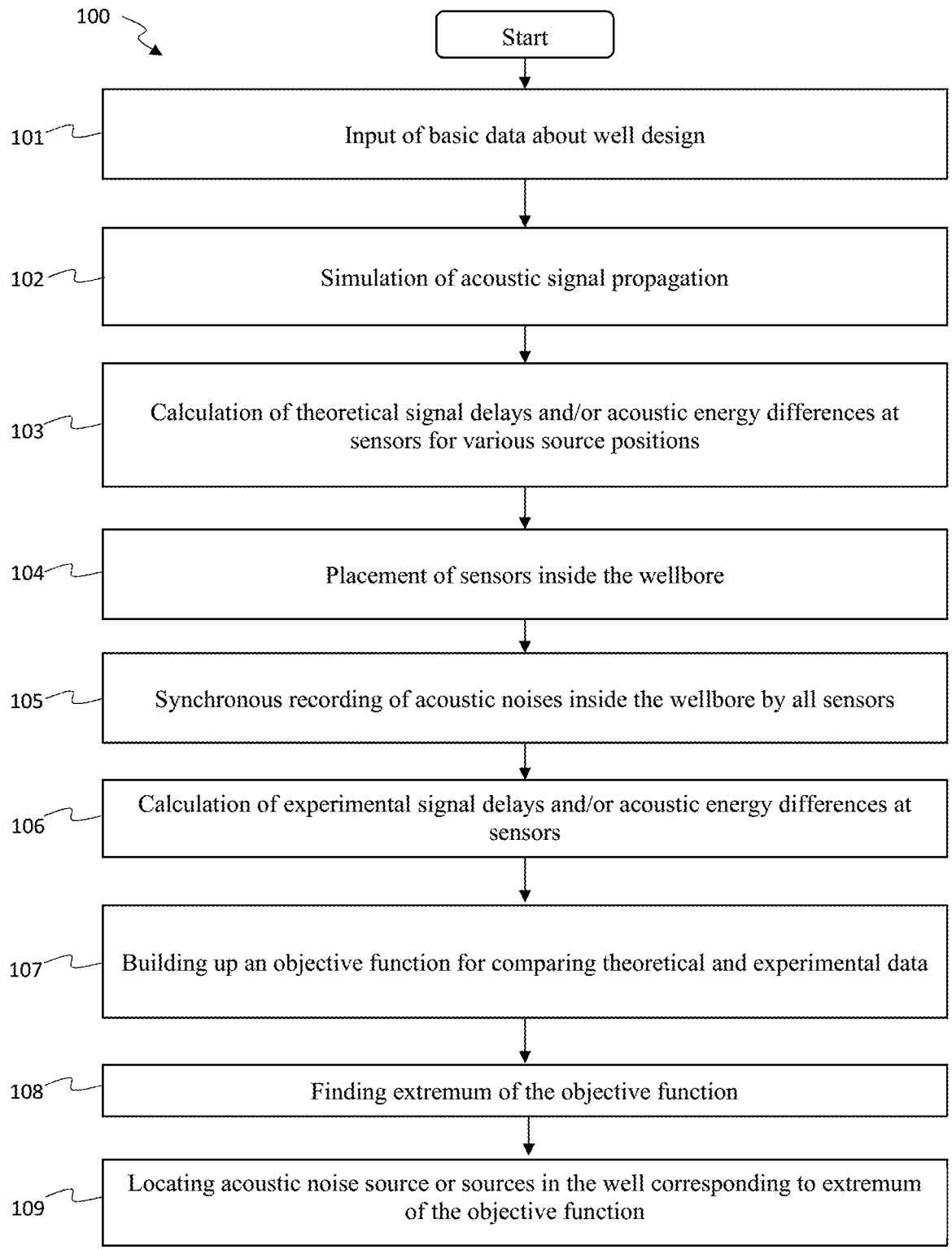
FIG. 2 shows a flowchart of acoustic noise source or sources locating in a well.

FIG. 1 shows a sketch of possible arrangement of recording sensors inside a multi-barrier well during passive acoustic logging. The recording sensors may be arranged in line along the well axis, as shown in the figure, or not in line with one another. In turn, sensors that are arranged in line with one another may be evenly or unevenly spaced. The figure indicates also two possible sources of acoustic noise in the well, namely, fluid seepage through a reservoir and fluid communication from the overlying reservoir. Detailed flowchart (100) of acoustic noise source or sources locating is presented in FIG. 2.

Stages (101) and (102) of locating acoustic noise source or sources in a well represent input of basic data about well design, such as diameters of the existing barriers, and simulating an acoustic signal propagation based on these data, respectively. The simulation is executed by an acoustic simulator, which is implemented on the basis of a specialized software. The acoustic simulator automatically calculates the acoustic field created by a source or sources at different distances from the well axis. Such calculation is executed for various positions of acoustic noise sources, which are characterized by depth from the surface and distance from the well axis and are determined in a different way in each survey depending on specific task. In order to increase of these calculations, said input data of simulator may also include types of barrier media, surrounding media and/or filling fluids in annuli, if known.

The acoustic simulator numerically solves wave equations for each of given media under corresponding boundary conditions. The wave equation for sound in a liquid is known and is described by Eq. (1). For the case when the noise source is in a liquid, for example, this equation takes form:

$$\Delta p + k^2 p = a(\omega)\delta(r - r_0), \quad (1)$$

where r is radius vector, $r_0$ is radius vector of the source, p is pressure, $\omega$ is angular frequency, $k=\omega/c$ is wave number, c is the sound speed, and $a(\omega)$ is complex amplitude of the sound generated by source.

Elastic forces in a solid are determined by Hooke's law, which is given by the following expression:

$$\sigma_{i,j} = \lambda \frac{\partial u_k}{\partial x_k}\delta_{i,j} + \mu\left(\frac{\partial u_i}{\partial x_j} + \frac{\partial u_j}{\partial x_i}\right) \quad (2)$$

Here $\sigma_{i,j}$ is the stress tensor, u is vector of current particle displacement from an equilibrium position, and $\lambda$, $\mu$ are Lame parameters. Lame coefficients are interrelated with the more common Young's modulus E and Poisson's ratio v by the formulas:

$$\lambda = \frac{vE}{(1+v)(1-2v)}$$
$$\mu = \frac{E}{2(1+v)}$$

If the stress tensor is known, strain increment is described by the equation:

$$\rho\frac{\partial^2}{\partial t^2}u_j = \frac{\partial \sigma_{i,j}}{\partial x_k} \quad (3)$$

The boundary conditions for two solid media can be written as follows:

1. $u_r^{solid1} = u_r^{solid2}$ (4)

2. $u_z^{solid1} = u_z^{solid22}$ (5)

3. $\sigma^{solid1}{}_n = \sigma^{solid2}{}_n$ (6)

where $\sigma^{solid1}n$ and $\sigma^{solid2}n$ are normal components of the stress tensors of the first and second solid, respectively, n is normal vector to the interface between them.

The boundary conditions for interface between solid and liquid can be written as:

1. $u_r^{(solid)} = \frac{1}{\omega^2\rho}(n\cdot\nabla)p$ (7)

2. $(n, \sigma_n^{solid1}) = -p$ (8)

3. $\left(\begin{bmatrix}-n_z\\n_r\end{bmatrix}, \sigma_n^{solid1}\right) = 0,$ (9)

where $\sigma_n$ is the normal component of the stress tensor, n is the normal vector to the interface.

Figure 3:
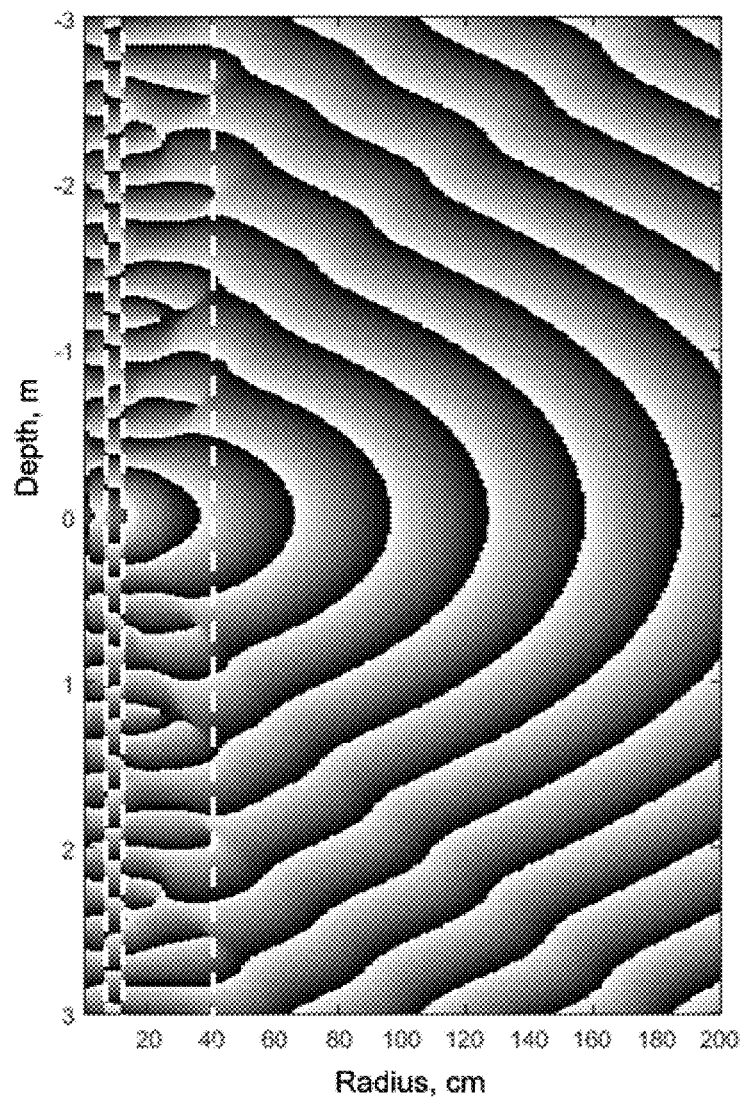
FIG. 3 illustrates an example of acoustic field phase difference between a source and a sensor at various vertical and/or radial distances from the acoustic noise source in the case of a multi-barrier well with a lifting and two casing strings (vertical white bars indicate the sequence of barriers).

The simulator yields solution of wave equations (1)-(3) with the boundary conditions (4)-(9) in the form of complex signal amplitudes generated by various sources located in different points of well space (for example, at different well barriers) in the point where the recording acoustic device is positioned. Obtained results contain complete information about the acoustic field and allow to calculate signal parameters such as group delays, phase delays, and/or acoustic energy differences in positions of the recording acoustic sensors in stage (103). An example of the calculated acoustic field phase difference between source and sensor at different vertical and/or radial positions of the acoustic noise source for the case of a multi-barrier wall design is shown in FIG. 3.

In stages (104)-(105), two or more sensors are placed inside the wellbore under survey, then acoustic emission (noise) is recorded at two or more depths in the well. If sensors other than optical fiber are used, said acoustic emission measurements in the well can be performed during device tripping either in or out of the hole. In this case, procedure of the device tripping in or out of the hole can be carried out with short stops. If such stops took place, just the data recorded during the stops should be used for analysis, since they are more reliable and require no additional filtering of noises created by the device tripping inside the well. Recommended duration of stops is about 10 seconds or more, recommended distance between stops is 1 m. In stage (106), resulted acoustic data are used to calculate experimental group delays, phase delays, and/or acoustic energy differences at the recording acoustic sensors. The group delays can be calculated, for example, by applying a generalized cross-correlation function to signal time records or using other commonly known methods.

Final stages represent locating acoustic noise source or sources in the well by comparing results of computer simulation and recorded data on acoustic signals inside the wellbore. In the stage (107), said results of computer simulation and recorded data on acoustic signals inside the wellbore are compared with the help of computational computer-assisted processing of all available data, which includes building of an objective function based on group delays, phase delays, acoustic sensor signal acoustic energy differences, and/or their combinations. Signal source in the wellbore serves as the argument for this function. The stage (108) covers finding extremes of the objective function, which contain information about real position or positions of acoustic signal source or sources in the wellbore. The stage (109) is intended for determining coordinates of source corresponding to each found extremum, namely, depth from the surface and distance from well axis. To build up an objective function, various metrics such as, for example, L1/L2 norms can be used or other approaches such as correlation analysis can be applied.

Below, application of a correlation function between theoretical and experimental group delays to localize the source is considered as an example of the objective function. This metric is defined here as:

$$B(r_0,z_0)=\Sigma_i \int \tau_i^{model}(r_0,z-z_0)\tau_i^{emp}(z)dz,$$

where $\tau_i^{model}$ are simulated group delays at i-th sensor and $\tau_i^{emp}$ are experimentally recorded group delays at the same i-th sensor.

Figure 4:
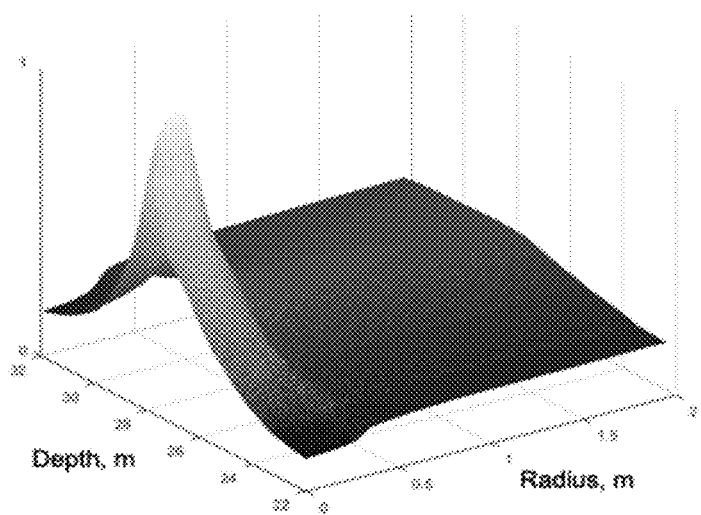
FIG. 4 illustrates an example of the correlation function between theoretical and experimental group delays, which can be used to determine position of the acoustic noise source in the well. There is only one noise source in the presented example, and position of the correlation function's maximum indicates that it is located at the distance 7 cm from well axis and at depth of 25.6 m from surface. In this example, an open discontinuity in the first barrier was chosen as the acoustic noise source.

Calculated values of the exemplifying correlation function for different depths and distances from well axis are presented in the form of a color surface 3D plot in FIG. 4. Maximum of this plot corresponds to the most probable position of the noise source in the well, probability degree being visualized by the color intensity. Two-dimensional projections of this or similar plots constructed using other types of objective functions hereinafter are referred as location plots. Sound spectrum plot and location plot are mutually complementary since the first one allows to analyze the spectral composition of an existing acoustic signal in the well, while the second one allows to locate a source of this signal.

Figure 5:
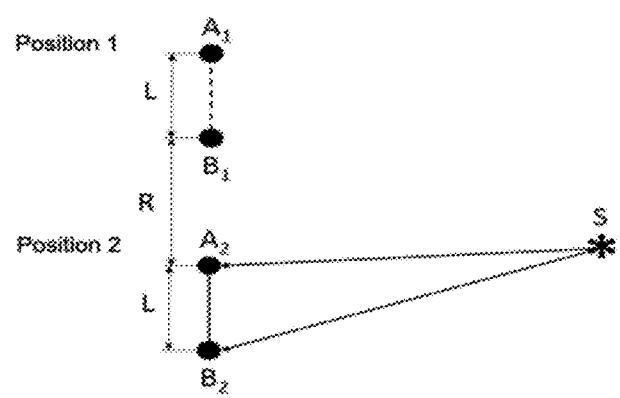
FIG. 5 illustrates application of proposed method for determining position of an acoustic noise source in the case when recording device has two sensors and measurements are performed in two positions. Here A1 is the first sensor in the first position, A2 is the first sensor in the second position, B1 is the second sensor in the first position, B2 is the second sensor in the second position, S is the source, L is the distance between sensors of the device, and R is the distance between positions of the device.
Figure 6:
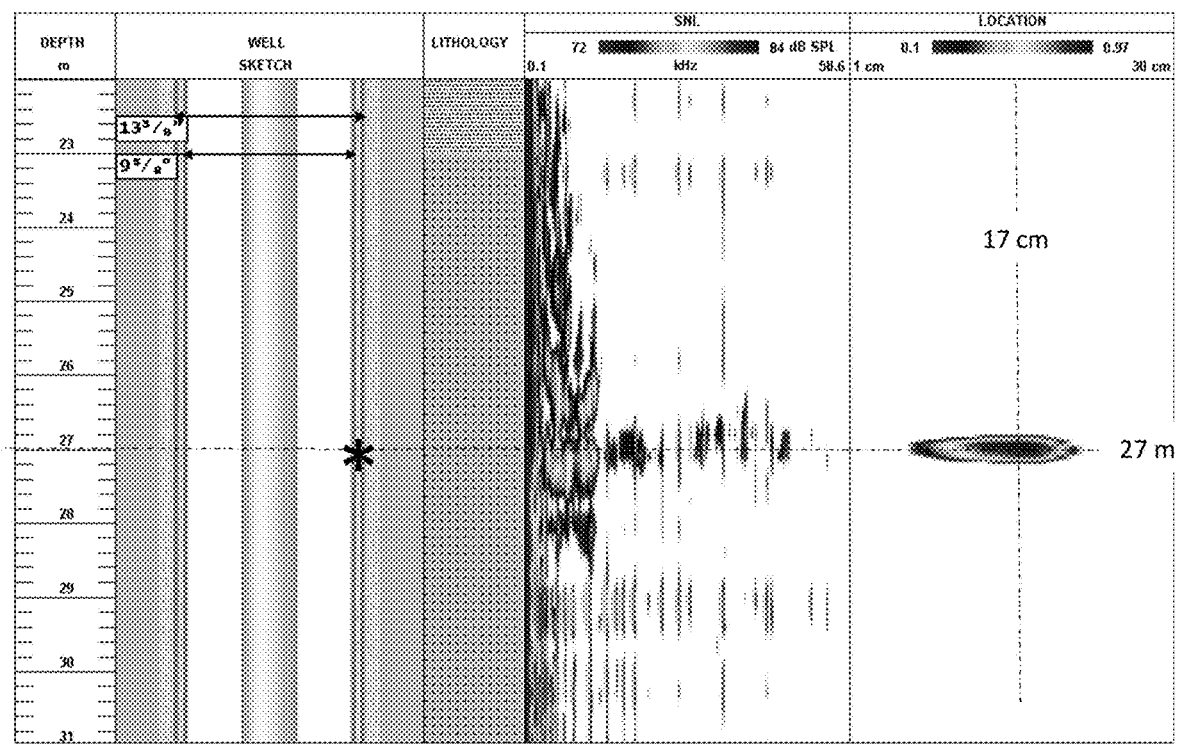
FIG. 6 presents an example of acoustic noise source locating in an injection well under laboratory conditions. Here acoustic noise in the wellbore was created by leakage in the second of well design. From left to right, the following columns are seen: depth (DEPTH), well design (WELL SKETCH), lithology (LITHOLOGY), sound spectrum with sound level metering, and a noise source position in the well (LOCATION).

In a particular case when two sensors are available, acoustic noise source in the well can be located based on data measured at two or more depths. Below, one approach to source locating in a homogeneous medium is considered in more detail to exemplify the claimed method. In the case of homogeneous medium, only two equations interrelating depth and distance from the well axis as sought parameters are needed to be defined. Assume that the signal is registered in two positions relative to the noise source shown in FIG. 5.

From physical reasons, signal arrival time delay between first and second sensors in position A (see FIG. 5) is related with distances between source and each sensor by the relationship:

$$A_1S-SB_1=c\Delta\tau_1, \quad (10)$$

where $A_1S$ is distance from the source to the first sensor, $SB_1$ is distance from the source to the second sensor, c is sound speed in given medium, and $\Delta\tau$ is signal arrival time delay between first and second sensors.

Similarly, for the second position this relationship takes form:

$$A_2S-SB_2=c\Delta\tau_2, \quad (11)$$

where $A_2S$ is distance from the source to the first sensor, $SB_2$ is distance from the source to the second sensor, c is sound speed in the medium, and $\Delta\tau$ is signal arrival time delay between first and second sensors.

Equations (10) and (11) are linearly independent and contain two unknown quantities, source coordinates, which can be found by solving this system of equations in any known way.

Example In the example below, a study is described that had been carried out in a laboratory injection well with a sand reservoir and acoustic noise source located in known position. During this experiment, an open discontinuity in the second barrier at depth 27 m and distance from well axis 17 cm was used as the noise source. The source was located using a device equipped with three sensors. Acoustic emission measurements were made synchronously by all sensors at stops during tripping the instruments out of the hole.

As a result of survey, the noise source was located at a distance of 26.6-27.2 m from the surface and 15.0-17.7 cm from the well axis, which demonstrates high locating accuracy of claimed method.

Figure 7:
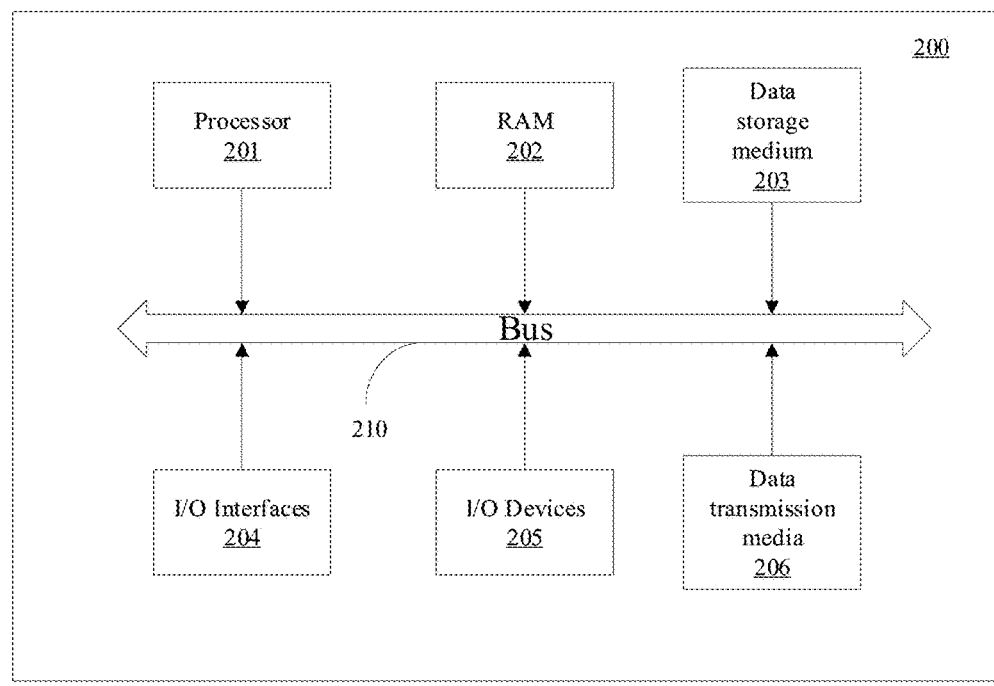
FIG. 7 demonstrates a general flowchart of the computing device.
Figure 8:
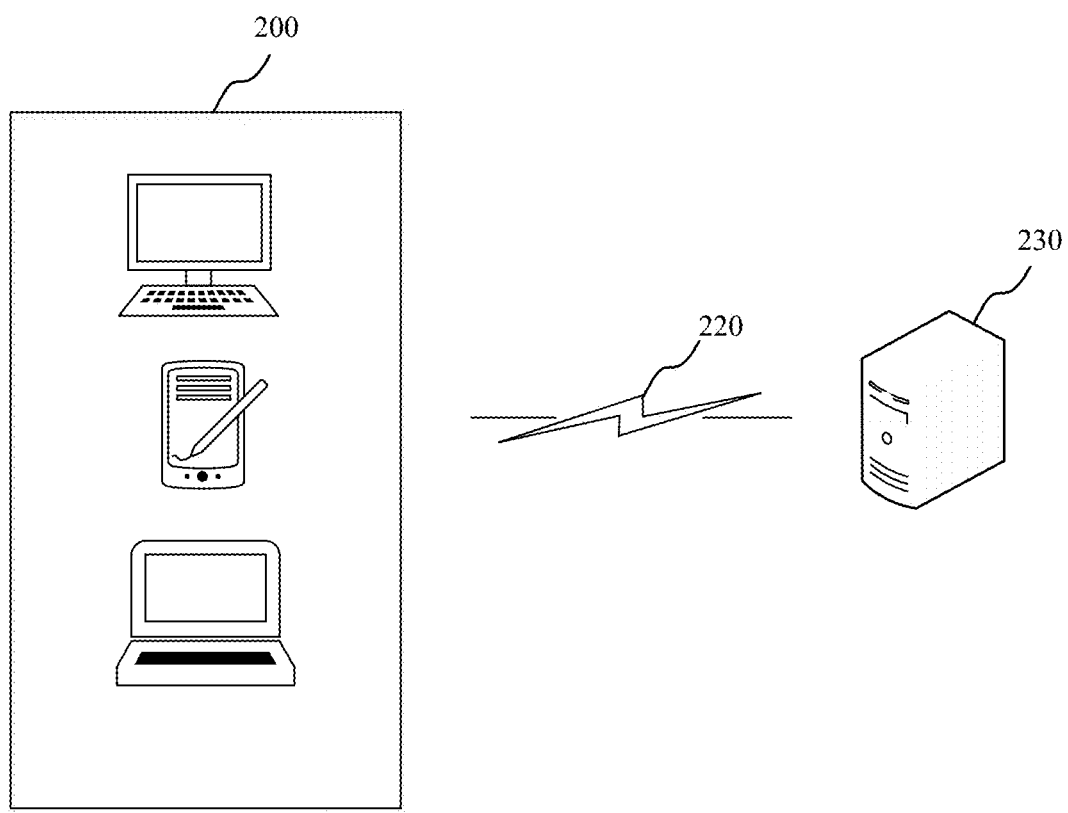
FIG. 8 shows a general view of an information exchange system between the computing device and a server.

As shown in FIG. 7, a computing device (200) used to implement the claimed method and system generally comprises the following components: one or more processors (201), short-term memory or RAM device (202), data storage medium (203), input/output (I/O) interfaces (204), I/O devices (205), and data transmission media (206). Components of the device (200) are connected by a bus (210) to transmit signals and provide functioning of the device (200).

RAM device (202) is designed for short-term storage of machine-readable instructions intended for being executed by one or more processors (201) to perform a number of computational operations in the stage of acoustic computer simulation of the claimed method (100).

The storage medium (203) can be a hard disk (HDD), solid-state drive (SSD), flash memory (NAND-flash, EEPROM, Secure Digital, etc.), optical disk (CD, DVD, Blue Ray), mini disk or their combinations.

I/O interfaces (204) are standard ports or devices and data transmission media connecting means, which are selected based on required system (200) performance, in particular: USB (2.0, 3.0, USB-C, micro, mini), Ethernet, PCI, AGP, COM, LPT, PS/2, SATA, FireWire, Lightning, etc.

I/O devices (205) are also selectable from a known range of common-purpose accessories such as a keyboard, touchpad, touch display, monitor, projector, mouse, joystick, trackball, light pen, stylus, sound output devices (speakers, headphones, built-in speakers, buzzer) etc.

Data transmission media (206) are selectable from devices designed to implement data transfer between different units via wired and/or wireless communications including, in particular: GSM modems, Wi-Fi transceivers, Bluetooth or BLE modules, NFC, Ethernet adapters, etc.

The computing device (200) may be a personal computer, notebook, smartphone, tablet, mainframe, etc.

FIG. 7 illustrates general principle of operation of the claimed system containing the computing device (200). Data representing acoustic signals recorded inside a wellbore are saved in the scanning device memory or transmitted to an external memory unit, for example, via wireless or wired data channels.

Then these data are transmitted via known data transmission media to the computing device (200) for implementing stages from (106) to (109) of the claimed method (100).

Further, obtained results of acoustic simulation and well survey data comparing are transferred to a remote server (230) for long-term storing.

The computing device (200) can also serve as a cloud information storage or server (230), which can be accessed via the Internet, for example, using personal computers, thin clients, etc.

This patent application discloses preferred embodiments of the invention and should not be considered as limiting other, more common, embodiments that fall within the requested scope of protection without departing from the scope of the invention, not beyond the scope of the requested legal protection, which is obvious to any person skilled in the art.

The invention claimed is:

1. A method for well analysis using a passive acoustic logging, the method comprising the steps of:
   computer simulating the acoustic field generated by one or more sources of acoustic signal inside the well;
   recording of acoustic signals inside the wellbore using a device for acoustic signal recording comprising at least two acoustic sensors; and
   locating the said acoustic signal source in the well by co-processing computer simulation data and data on acoustic signals inside the wellbore recorded using the aforementioned device.

2. The method according to claim 1, wherein position of the acoustic signal source is characterized by depth from the surface and distance from the well axis.

3. The method according to claim 1, wherein acoustic signals inside the wellbore are recorded synchronously by all sensors.

4. The method according to claim 1, wherein computer simulation of acoustic field in the well is made using an acoustic simulator.

5. The method according to claim 1, wherein acoustic signals in a well are recorded at two or more depths if two or more acoustic sensors are used.

6. The method according to claim 1, wherein azimuthal noise source direction is additionally determined in the case of azimuthal distribution of three or more acoustic sensors in the well.

7. The method according to claim 1, wherein a well source generated acoustic field is calculated in the stage of computer simulation at various distances from the source for various source depths and radial distances from wellbore.

8. The method according to claim 7, wherein the calculations are performed taking into consideration the well design parameters including at least radii of the well barriers.

9. The method according to claim 7, wherein types of barrier media, surrounding media and/or filling fluids in annuli are additionally taken into consideration.

10. The method according to claim 1, wherein group delays, phase delays, and/or acoustic sensor signal acoustic energy differences are determined by the device after recording acoustic signals from inside the wellbore in the stage of computer simulation.

11. The method according to claim 1, wherein results of computer simulation are compared with data on acoustic signals inside the wellbore recorded using the said device by means of building up an objective function based on group delays, phase delays, and/or acoustic sensor signal acoustic energy differences with the source position in the wellbore as the argument.

12. The method according to claim 11, wherein source position in the wellbore is determined from an extremum of the objective function.

13. A system for well analysis using a passive acoustic logging comprising:
   a device for recording acoustic signals inside a wellbore, comprising at least two acoustic sensors and designed to receive data on one or more acoustic signal sources in the well and transmit received data to a computing device; and
   a computing device comprising at least one processor and at least one machine-readable instruction storage unit and designed to simulate acoustic field generated by one or more sources of acoustic signal in the well by executing the stored instructions by at least one processor,
   wherein
   the computing device is designed to co-process computer simulation data and data on acoustic signals inside the wellbore recorded by the aforementioned recording device and locate the sought acoustic signal source based on said co-processing.

14. The system according to claim 13, wherein the computing device is selected from the group consisting of computer, tablet, server or smartphone.

15. The system according to claim 13, wherein the acoustic signal recording device transmits scan data to the computing device via a wired or wireless data channel.

16. The system according to claim 13, wherein position of the acoustic signal source is characterized by depth from the surface and distance from the well axis.

17. The system according to claim 13, wherein acoustic signals inside the wellbore are recorded synchronously by all sensors of the acoustic signal recording device.

18. The system according to claim 13, wherein computer simulation of generated acoustic field in the well is made using an acoustic simulator.

19. The system according to claim 13, wherein acoustic signals in a well are recorded at two or more depths if two or more acoustic sensors are used.

20. The system according to claim 13, wherein azimuthal noise source direction is additionally determined in the case of azimuthal distribution of three or more acoustic sensors in the well.

* * * * *